United States Patent
Kassner

(10) Patent No.: US 7,275,509 B2
(45) Date of Patent: Oct. 2, 2007

(54) METHOD FOR ENGAGING THE STARTER PINION OF A STARTER WITH THE STARTER RING GEAR OF AN INTERNAL COMBUSTION ENGINE DURING THE RUNNING-DOWN OF THE INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/546,813

(22) Filed: Oct. 11, 2006

(65) Prior Publication Data

US 2007/0137602 A1  Jun. 21, 2007

(30) Foreign Application Priority Data

Oct. 13, 2005  (DE) .................... 10 2005 049 092

(51) Int. Cl.
  *F02N 11/00* (2006.01)
  *F02N 15/02* (2006.01)
(52) U.S. Cl. .................. 123/179.25; 123/406.58; 123/406.61; 123/406.63; 74/6; 74/7 R
(58) Field of Classification Search .......... 123/179.25, 123/179.4, 179.3, 185.13, 406.58, 406.61, 123/406.63, 436, 631; 290/38 E, 38 R; 74/6, 74/7 R
See application file for complete search history.

(56) References Cited

U.S. PATENT DOCUMENTS

| 4,385,605 | A  | * | 5/1983  | Petrie et al. | 123/406.61 |
|-----------|----|---|---------|---------------|------------|
| 6,397,808 | B1 | * | 6/2002  | Tanaka et al. | 123/179.25 |
| 6,651,603 | B2 | * | 11/2003 | Osada et al.  | 123/179.3  |
| 6,684,687 | B1 | * | 2/2004  | Frojdh        | 73/117.3   |
| 6,784,658 | B2 | * | 8/2004  | Kawagoe et al.| 324/163    |
| 6,907,342 | B1 | * | 6/2005  | Matsuoka      | 701/113    |

* cited by examiner

*Primary Examiner*—Stephen K. Cronin
*Assistant Examiner*—Ka Chun Leung
(74) *Attorney, Agent, or Firm*—Kenyon & Kenyon LLP

(57) ABSTRACT

A method is provided for engaging a starter pinion of a starter with a starter ring gear of an internal combustion engine during the running-down of the internal combustion engine, which internal combustion engine has an arrangement for determining rotational speed and rotational direction of a crankshaft. The starter pinion is engaged with the starter ring gear when the following conditions are satisfied: a) the speed of the internal combustion engine is below a maximum speed and above a minimum speed; and b) the rotational direction corresponds to the forward rotational direction of the crank shaft.

5 Claims, 3 Drawing Sheets

METHOD FOR ENGAGING THE STARTER PINION OF A STARTER WITH THE STARTER RING GEAR OF AN INTERNAL COMBUSTION ENGINE DURING THE RUNNING-DOWN OF THE INTERNAL COMBUSTION ENGINE

FIELD OF THE INVENTION

The present invention relates to a method for engaging a starter pinion of a starter with a starter ring gear of an internal combustion engine during the running-down of the engine.

BACKGROUND INFORMATION

One method for reducing the fuel consumption of internal combustion engines, in particular vehicles, is start/stop operation, in which the vehicle engines are switched off, for instance, when stopped for a relatively long time in front of traffic lights. As soon as the driver wants to continue driving, the vehicle engine is restarted. The restarting produces unavoidable starting noises, which affect riding comfort. The starting noises are a consequence of, inter alia, the engagement of the starter pinion with the starter ring gear of the vehicle.

In order to reduce the engaging noise and the starting time as well, it is known that the engagement for restarting the engine can be carried out not only after the engine is completely stopped, but rather during its running-down phase. In this manner, the awareness of the unpreventable engagement noise produced by the meeting of the starter pinion and the starter ring gear on top of each other is considerably reduced.

The engagement during the running-down of the engine can only take place at low engine speeds in the range of app. 50 to 100 revolutions/minute. It is problematic that the rotational direction of the engine can change several times during the running-down phase of the engine. This known, final oscillation of the engine during the running-down of the engine is disadvantageous for the engagement of the starter pinion with the starter ring gear, since it may result in engagement occurring during a reversing motion of the engine, which in turn results in a marked jerk of the engine. This jerk stresses the mechanical parts and is perceived by the driver as uncomfortable.

Therefore, an object of the present invention is to provide a method of engaging during the running-down of the engine, which method reduces the stress on the mechanical parts as much as possible and additionally increases the ride comfort of the driver.

SUMMARY OF THE INVENTION

The present invention provides a method for engaging a starter pinion of a starter with a starter ring gear of an internal combustion engine during the running-down of the engine, the internal combustion engine having means for determining rotational speed and rotational direction of a crankshaft, the starter pinion being engaged with the starter ring gear, when the speed of the internal combustion engine is below a maximum speed and above a minimum speed, and when the rotational direction corresponds to the forward rotational direction of the crank shaft.

With the aid of the method according to the present invention, the starter pinion may be engaged with the starter ring gear of the internal combustion engine in such a manner, that this does not occur when the engine is rotating backwards. This prevents the stressing of the parts as a result of engagement during the backward rotation of the internal combustion engine caused by the final oscillating behavior of the engine.

According to the present invention, the engaging signal is transmitted to the starter when two conditions, A and B, are satisfied: the speed of the internal combustion engine is within a predefined speed range (condition A), and the ascertained rotational direction of the internal combustion engine corresponds to the forward rotational direction (condition B). In addition to condition B, condition A ensures that the rotational direction of the internal combustion engine does not reverse during the engagement of the starter pinion with the starter ring gear. It is preferably provided that the means for determining rotational speed and rotational direction of the internal combustion engine include a signal-generating disk, which is coupled to the internal combustion engine and is marked by an alternating arrangement of teeth and tooth spaces, the signal-generating disk being assigned a first and a second sensor, which are each able to generate an electrical signal that may assume at least two signal levels, one of the signal levels being assigned to a tooth and the other to a tooth space, the rotational direction of the crank shaft also being ascertained by utilizing, in each instance, a rising or falling signal edge of the one signal and the signal level of the other signal. In this context, it is provided that the internal combustion engine include a control unit for the starter, the control unit generating an engaging signal and transmitting it to the starter, the starter engaging the starter pinion with the starter ring gear in response to the engaging signal.

In one example implementation of the method according to the present invention, it is provided that both the time between the generating of the engaging signal and the engaging of the starter pinion with the starter ring gear, and a model of the running-down characteristics of the engine, be stored in the control unit for different operating states of the engine, the time of the engaging signal being determined from the model of the running-down characteristics of the engine and the time between generation of the engaging signal and engagement of the starter pinion with the starter ring gear, in such a manner, that engagement of the starter pinion with the starter ring gear is prevented when the crankshaft is rotating in the reverse direction.

In this context, the time between the generation of the engaging signal and the actual engagement of the starter pinion with the starter ring gear is incorporated into the method. Since, during this time interval, a reversal of the initially ascertained, forward rotational direction to the reverse rotational direction disadvantageous for engagement cannot be ruled out, the time between generation of the engaging signal and engagement of the starter pinion with the starter ring gear, which is preferably ascertained by measuring it, and the model of the running-down characteristics of the internal combustion engine are utilized for determining a suitable time for the engaging signal, so that engagement of the starter pinion with the starter ring gear is prevented when the engine is rotating in the reverse direction. Therefore, when viewed as a whole, the possibly disadvantageous delay between the generation of the engaging signal and the actual engagement is advantageously taken into account by this example implementation of the present invention. Since the utilized running-down model includes several operating states, which cover a large range of operating states actually occurring during operation, disadvantageous engagement during rotation of the engine in the reverse direction may be practically ruled out.

The present invention also provides a control unit for a starter of an internal combustion engine, having control means for engaging the starter pinion of a starter with the starter ring gear of an internal combustion engine during the running-down of the engine, which internal combustion engine has means for determining rotational speed and rotational direction of a crankshaft. The starter pinion is engaged with the starter ring gear when the following conditions are satisfied: a) the speed of the internal combustion engine is below a predefined maximum speed and above a predefined minimum speed; and b) when the rotational direction corresponds to the forward rotational direction of the crank shaft.

DETAILED DESCRIPTION

Figure 1:
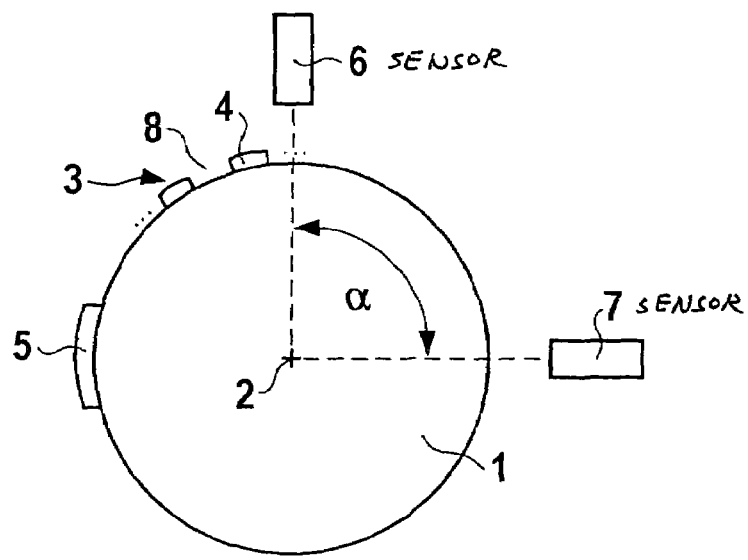
FIG. 1 shows a schematic illustration of a signal-generating disk having two sensors assigned to the signal-generating disk.

FIG. 1 shows a schematic illustration of a signal-generating disk 1 having two sensors assigned to the signal-generating disk. The signal-generating disk 1 is, for example, situated directly on a crankshaft or camshaft, or is indirectly connected to the camshaft with respect to the rotation, using gear elements. The signal-generating disk rotates about an axis 2. Markings 3 are situated at the circumference of signal-generating disk 1. The markings are made up, for example, of teeth 4, which are each positioned equidistantly over the circumference of the signal-generating disk. In each instance, tooth spaces 8 are situated between teeth 4. A further mark 5, e.g., in the form of a tooth 4 twice as wide, as shown here, or in the form of a greater tooth distance between two teeth 4 or the like, designates an identified neutral position of the crankshaft (zero marking). The teeth each run across an angle of approximately 3°, the tooth spaces run across an angle of 3°. Therefore, a tooth 4 and adjacent tooth space 8 run across an angle of approximately 6°. A first sensor 6 and a second sensor 7 are positioned at signal-generating disk 1. Sensors 6, 7 are distributed in the different angular ranges over signal-generating disk 1. The two sensors 6, 7 may be situated in a common housing. In this case, they may be positioned at a (small) angle α to each other, which may be, for example, approximately 1 to 15°. A particularly advantageous means for achieving the object is a sensor having at least two sensor elements placed in spatial proximity. One variant is the integration of at least two Hall elements on an IC at a distance of a few millimeters. The IC also contains the evaluation circuit. The two Hall elements then correspond to sensors 6 and 7, and the evaluation circuit determines the direction of rotation from the temporal relationship of the sensor signals and generates the described pulse as an output signal. The design of the known crankshaft sensor may then be retained and allows a transition to this sensor without any large system adjustments at the engine.

During one rotation of the crankshaft and, therefore, of signal-generating disk 1, teeth 4 and marking 5 are each led past sensors 6, 7. This triggers, for example, an electrical signal in sensors 6, 7. Sensors 6, 7 may be inductive or capacitive sensors. As an alternative, sensors 6, 7 may also function optically, e.g. by being able to measure, through teeth 4 and marking 5, optical changes produced in them.

Figure 2:
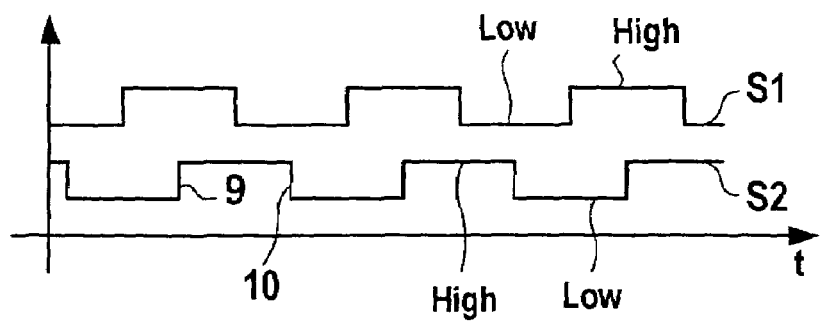
FIG. 2 shows a graph of the signal pattern of the two sensors versus time.

FIG. 2 shows the signal pattern of sensors 6, 7 over time t. The leading-past of teeth 4 and tooth spaces 8 in an alternating manner generates a square-wave signal in both signal pattern S1 of first sensor 6 and signal pattern S2 of second sensor 7. The two signals assume the values "High" and "Low." The transition from "Low" to "High" is designated as rising edge 9, and the transition from "High" to "Low" is designated as falling edge 10.

In the following Tables 1 and 2, rising edge 9 is designated by "L->H," and falling edge 10 is designated by "H->L." The rotational direction of the crankshaft is denoted by DR, counterclockwise rotation of the crankshaft is denoted by ->, and clockwise rotation is denoted by <-.

| Table 1 | | | Table 2 | | |
| --- | --- | --- | --- | --- | --- |
| S1 | S2 | DR | S1 | S2 | DR |
| H -> L | L | -> | H -> L | H | <- |
| L -> H | H | -> | L -> H | L | <- |
| H | H -> L | -> | L | H -> L | <- |
| L | L -> H | -> | H | L -> H | <- |

During the rising and falling edges of signals S1 and S2, the direction in which the crankshaft is turning may be ascertained from the other respective signal, which is then constant. For example, if the edge of signal S1 is falling (H->L) and signal S2 is at the High level, then the crankshaft is rotating counterclockwise.

The usual resolution of the angle is 6°, and 58 teeth pairs or pole pairs are positioned on the signal-generating wheel, with a gap of 2 angular units. Angle alpha is selected so as to not constitute a direct multiple of the graduation of signal-generating disk 1, since then, the signals of the two sensors 6, 7 would each be synchronous, without a phase shift.

Figure 3:
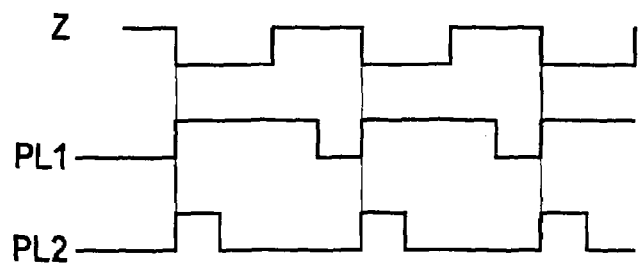
FIG. 3 shows a sketch of the signal pattern of a sensor versus time, as well as two encoded signals derived from the signal patterns of the two sensors, plotted versus time.

In order to allow a direct evaluation of the rotational direction, using a signal for the engine control unit, a signal encoded according to FIG. 3 is now generated. Shown are signal pattern Z of one of sensors 6, 7 versus time, as well as two different signals PL1 and PL2 derived from it, versus time. Using Table 1 or 2, signal Z initially supplied as a square-wave signal of one of sensors 6, 7 is converted into a pulse-length encoded sensor signal (PL) having directional information, as shown in FIG. 3. In the example of FIG. 3, one signal PL1 having a longer, defined High level indicates, for example, the clockwise rotation, and one signal PL2 having a shorter, defined High level indicates the counterclockwise rotation of the crankshaft. The rising edges are also temporally identical (and therefore, identical with respect to the crankshaft angle) to the signal of one of sensors 6, 7.

Figure 4:
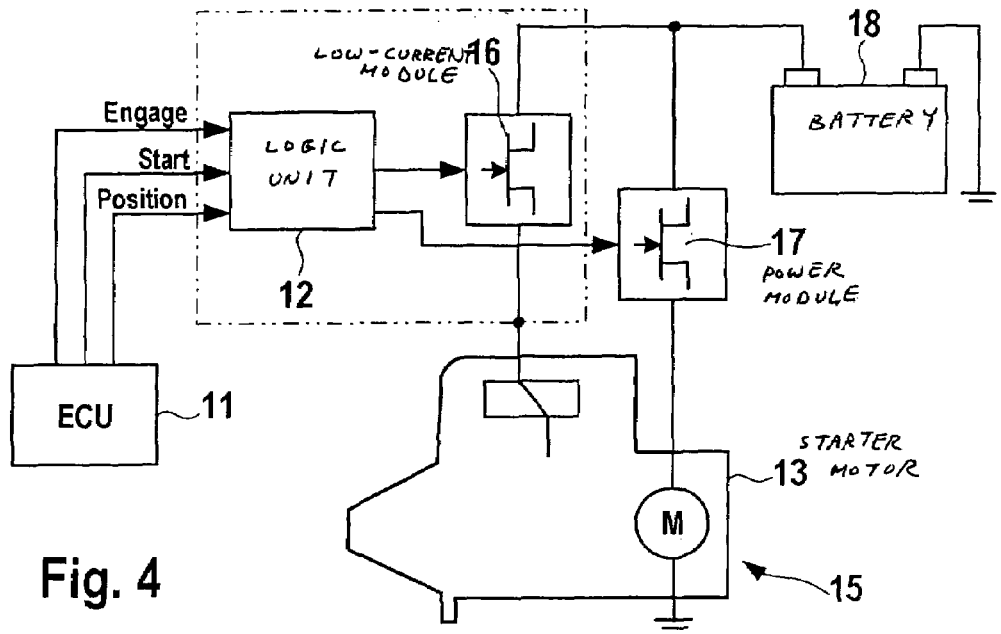
FIG. 4 shows a schematic block diagram of a starter.

FIG. 4 schematically shows a starter 15 of a vehicle, having a starter motor 13 and an engaging unit 14 for engaging the starter pinion (not shown) with the starter ring gear. Starter 15 is controlled by control unit 11, which is schematically represented in FIG. 4 and may be a separate module or integrated into an existing engine control unit (not shown). Control unit 11 transmits control signals, such as, in particular, engaging signals, to a logic unit 12, the control signals being combined with additional transmitted signals by logic unit 12. As a function of the result of the logic operation performed in logic unit 12, a control signal is transmitted by logic unit 12 to a low-current module 16, in order to power engaging unit 14 with battery current of vehicle battery 18 for the purpose of engaging the starter pinion (not shown). Thus, engagement would then occur, for example, when, in addition to an engaging signal, control unit 11 transmits a start signal resulting from a start command, e.g., one triggered by the manipulation of the vehicle accelerator pedal after a long vehicle stop, to logic unit 12. Control signals may also be transmitted by logic unit 12 to a power module 17, in order to supply starter motor 13 with battery current to drive the same.

The above-described, pulse-length-encoded sensor signal (PL) having directional information is generated by appropriately processing signals S1 and S2 on sensors 6, 7, and subsequently transmitted to control unit 11 schematically represented in FIG. 4. As an alternative, the signal processing for generating the pulse-length-encoded sensor signal may occur in control unit 11, after signals S1 and S2 of sensors 6, 7 have been transmitted to control unit 11. An engaging signal is then transmitted by control unit 11 to logic unit 12 as a function of the rotational-direction information and given engine speed. According to the present invention, this occurs when the rotational-direction information implies that the rotational direction of the vehicle engine corresponds to the forward rotational direction and the engine speed is within a predefined speed range.

Figure 5:
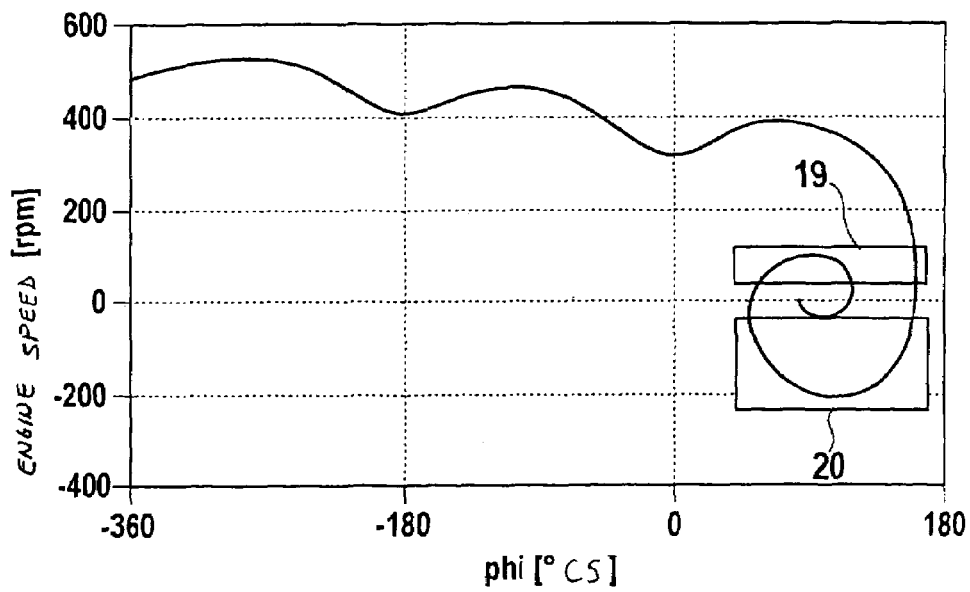
FIG. 5 shows a graph illustrating the running-down characteristics of an engine, which graph shows the speed of the engine plotted versus the crankshaft angle.

FIG. 5 shows a graph illustrating the running-down characteristics of an engine, in which graph the engine speed, rpm, is plotted versus the crankshaft angle, ° CS, 0° CS corresponding to an arbitrary neutral position, e.g., top dead center of a cylinder. In this connection, positive speeds correspond to rotation of the engine in the forward direction. One can see that, as a result of the known, final oscillating behavior after the switching-off of the engine, the engine speed changes its sign, i.e. the rotational direction changes from the forward rotational direction to the reverse rotational direction. Only in range 19 does the present invention provide for control unit 11 to output an engaging signal, and for engagement of the starter pinion with the starter ring gear to finally occur. The present invention prevents engagement in range 20, in which the engine rotates in the reverse direction.

Figure 6:
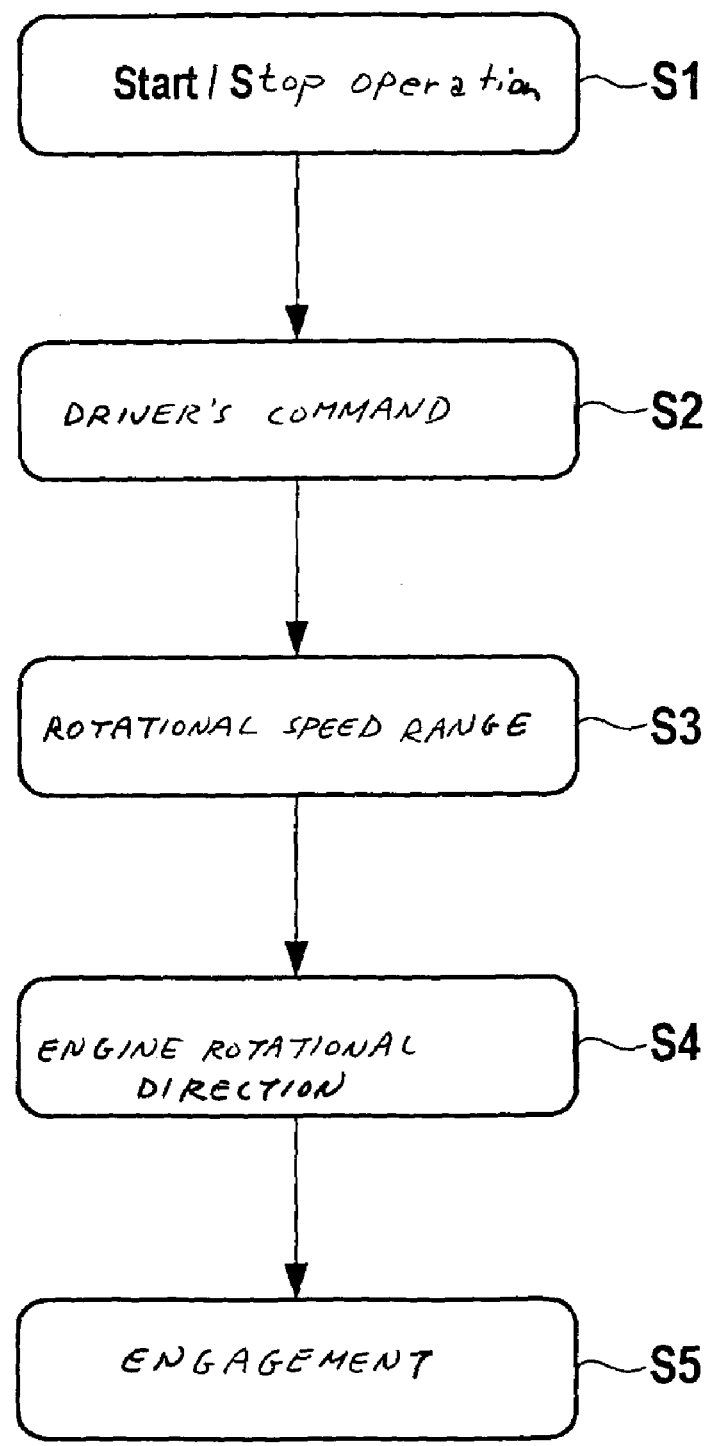
FIG. 6 is a flow chart of the method according to the present invention.

FIG. 6 shows a flowchart illustrating the sequence of the method according to the present invention. In step S1, it is first checked if the conditions for start/stop operation are satisfied. In step 2, it is then checked if a driver's command is present, e.g., triggered by manipulation of the accelerator pedal. Only when these conditions are satisfied is it checked, in steps S3 and S4, whether the engine speed is within a predefined speed range and whether the rotational direction of the engine corresponds to the forward rotational direction. When these conditions are satisfied, then the engagement of the starter pinion with the starter ring gear occurs in step S5.

What is claimed is:

1. A method for engaging a starter pinion of a starter with a starter ring gear of an internal combustion engine during a running-down of the internal combustion engine, wherein the internal combustion engine has an arrangement for determining a rotational speed and a rotational direction of a crankshaft, the method comprising:

determining whether the rotational speed of the internal combustion engine is below a predetermined maximum speed and above a predetermined minimum speed;
   determining whether the rotational direction of the crankshaft corresponds to a forward rotational direction; and
   engaging the starter pinion with the starter ring gear if: a) the rotational speed of the internal combustion engine is below the predetermined maximum speed and above the predetermined minimum speed; and b) the rotational direction of the crankshaft corresponds to the forward rotational direction.

2. The method as recited in claim 1, wherein:
   the arrangement for determining the rotational speed and the rotational direction of the crankshaft includes a signal-generating disk which is coupled to the internal combustion engine and has a marking, wherein the marking includes an alternating arrangement of teeth and tooth spaces; and
   a first sensor and a second sensor are assigned to the signal-generating disk, wherein the first and second sensors each generate an electrical signal configured to represent one of two different signal levels, a first signal level being assigned to a tooth and a second signal level being assigned to a tooth space, and wherein the rotational direction of the crank shaft is ascertained by utilizing a) one of a rising and falling edge of an electrical signal of one of the first and second sensors, and b) and a signal level of an electrical signal of the other one of the first and second sensors.

3. The method as recited in claim 1, wherein the internal combustion engine includes a control unit for the starter, the control unit generating and transmitting an engaging signal to the starter, and wherein the starter engages the starter pinion with the starter ring gear in response to the engaging signal.

4. The method as recited in claim 3, wherein:
   the control unit stores, for different operating states of the internal combustion engine, a) a time period between generation of the engaging signal and engagement of the starter pinion with the starter ring gear, and b) a model of running-down characteristics of the internal combustion engine; and
   the time of the engaging signal is determined from the model of running-down characteristics of the internal combustion engine and the time period between generation of the engaging signal and engagement of the starter pinion with the starter ring gear, in such a manner that engagement of the starter pinion with the starter ring gear is prevented when the crankshaft is rotating in a reverse direction.

5. A control system for a starter of an internal combustion engine, comprising:
   a controller for engaging a starter pinion of a starter with a starter ring gear of an internal combustion engine during a running-down of the internal combustion engine; and
   an arrangement for determining a rotational speed and a rotational direction of a crankshaft, wherein the arrangement for determining the rotational speed and the rotational direction of the crankshaft includes a signal-generating disk which is coupled to the internal combustion engine and has a marking, wherein the marking includes an alternating arrangement of teeth and tooth spaces, wherein a first sensor and a second sensor are assigned to the signal-generating disk, wherein the first and second sensors each generate an electrical signal configured to represent one of two different signal levels, a first signal level being assigned to a tooth and a second signal level being assigned to a tooth space, and wherein the rotational direction of the crank shaft is ascertained by utilizing a) one of a rising and falling edge of an electrical signal of one of the first and second sensors, and b) and a signal level of an electrical signal of the other one of the first and second sensors;

wherein the starter pinion is engaged with the starter ring gear if: a) the rotational speed of the internal combustion engine is below the predetermined maximum speed and above the predetermined minimum speed; and b) the rotational direction of the crankshaft corresponds to the forward rotational direction.

* * * * *